United States Patent
Harada

(10) Patent No.: US 9,491,368 B2
(45) Date of Patent: Nov. 8, 2016

(54) INFORMATION OBTAINING AND VIEWING DEVICE, DATA PROCESSING METHOD THEREOF, AND NON-TRANSITORY COMPUTER READABLE MEDIUM STORING A PROGRAM

(71) Applicant: NEC Corporation, Tokyo (JP)

(72) Inventor: Hiroo Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/416,398

(22) PCT Filed: Jul. 19, 2013

(86) PCT No.: PCT/JP2013/069627
§ 371 (c)(1),
(2) Date: Jan. 22, 2015

(87) PCT Pub. No.: WO2014/017393
PCT Pub. Date: Jan. 30, 2014

(65) Prior Publication Data
US 2015/0181126 A1 Jun. 25, 2015

(30) Foreign Application Priority Data

Jul. 24, 2012 (JP) .................................. 2012-164158

(51) Int. Cl.
*G09G 5/00* (2006.01)
*H04N 5/232* (2006.01)
(Continued)

(52) U.S. Cl.
CPC .......... *H04N 5/23293* (2013.01); *G06F 3/002* (2013.01); *G06F 3/005* (2013.01);
(Continued)

(58) Field of Classification Search
CPC .............................................. G06B 2027/014
USPC ........................................................ 345/629
See application file for complete search history.

(56) References Cited

U.S. PATENT DOCUMENTS

2013/0085345 A1* 4/2013 Geisner .................. G06Q 30/00
600/300

FOREIGN PATENT DOCUMENTS

JP 2006-148618 6/2006
JP 2006-285654 10/2006
(Continued)

OTHER PUBLICATIONS

International Search Report and Written Opinion mailed Aug. 20, 2013 in corresponding PCT International Application.
(Continued)

*Primary Examiner* — Thomas Lett
(74) *Attorney, Agent, or Firm* — Finnegan, Henderson, Farabow, Garrett & Dunner LLP

(57) ABSTRACT

This information processing device (100) comprises: a video data acquisition unit (102) that sequentially acquires video data resulting from a portion of an imaging subject being imaged by an imaging unit; an image recognition unit (104) that detects that a portion of a pre-registered image is included in the video data, and recognizes the images therein; an appended data extraction unit (108) that extracts the respective appended data of each image from an appended data storage unit (106) that stores appended data corresponding to each of a plurality of recognized images; an appended data display unit (110) that displays the extracted appended data of each image at each relevant image position of the video data; and a display control unit (112) that, in accordance with a user operation, switches from a process that successively displays a synthesized video, which is on the basis of synthesized video data, at the display unit of a portable terminal, to a process that, as a still image at the display unit of the portable terminal, fixedly displays the synthesized video at the point in time corresponding to the user operation.

15 Claims, 14 Drawing Sheets

(51) Int. Cl.
  *H04N 21/472* (2011.01)
  *G06F 3/00* (2006.01)
  *G06F 3/01* (2006.01)
  *G06F 17/30* (2006.01)
  *G06Q 30/00* (2012.01)
  *G06Q 30/02* (2012.01)
  *G06T 3/00* (2006.01)
  *G06K 9/00* (2006.01)

(52) U.S. Cl.
  CPC .......... *G06F 3/011* (2013.01); *G06F 17/3079* (2013.01); *G06F 17/3082* (2013.01); *G06K 9/00671* (2013.01); *G06Q 30/00* (2013.01); *G06Q 30/02* (2013.01); *G06T 3/0068* (2013.01); *H04N 5/23229* (2013.01); *H04N 21/47205* (2013.01); *G06K 2209/17* (2013.01)

(56) References Cited

FOREIGN PATENT DOCUMENTS

| JP | 2010-238118 | 10/2010 |
| JP | 2010-272054 | 12/2010 |
| JP | 2011-81556 | 4/2011 |
| JP | 2011-186007 | 9/2011 |
| WO | WO 2010/150643 A1 | 12/2010 |

OTHER PUBLICATIONS

Office Action mailed on Nov. 4, 2015 by the Japanese Patent Office in counterpart Japanese Patent Application No. 2014-526892.

* cited by examiner

Fig.7

430 ITEM MASTER

| ITEM ID |
| --- |
| ITEM NAME |
| UNIT PRICE |
| UNIT PRICE (WITH TAX) |
| ALLERGY SUBSTANCE INFORMATION |
| COUPON INFORMATION |

INFORMATION OBTAINING AND VIEWING DEVICE, DATA PROCESSING METHOD THEREOF, AND NON-TRANSITORY COMPUTER READABLE MEDIUM STORING A PROGRAM

CROSS-REFERENCE TO RELATED PATENT APPLICATIONS

This application is a National Stage Entry of International Application No. PCT/JP2013/069627, filed Jul. 19, 2012, which claims priority from Japanese Patent Application No. 2012-164158, filed Jul. 24, 2012. The entire contents of the above-referenced applications are expressly incorporated herein by reference.

TECHNICAL FIELD

The present disclosure relates to an information processing device, a data processing method thereof, and a program.

BACKGROUND ART

The building relevant information providing device disclosed in PTL 1 is capable of obtaining information relevant to a building based on the image thereof picked-up by a mobile terminal provided with a camera.

The commercial item information searching system disclosed in PTL 2 searches commercial item information through a network using an image picked-up by a terminal and reproduced and displayed on an image reproducing device, and orders a commercial item on sale based on the acquired commercial item information.

CITATION LIST

Patent Literature

PTL 1: JP 2010-272054 A
PTL 2: JP 2006-285654 A

SUMMARY OF INVENTION

Technical Problem

According to the technologies disclosed in the above-explained literatures, when, for example, the feature quantity of an image is extracted from successive videos picked up by a terminal, and is displayed with appended information being extracted, if the image-pickup position of the videos changes despite the user's intent, the image becomes out of the video range in accordance with the position change, and the appended information becomes not viewable.

The present disclosure has been made in view of the aforementioned circumstances, and it is an objective of the present disclosure to provide an information processing device, a data processing method thereof, and a program that can improve the operability at the time of information viewing through a mobile terminal.

Solution to Problem

An information processing device according to an aspect of the present disclosure includes: a video data acquirer that sequentially acquires video data which is picked up by an imager and which contains at least a part of imaging subject where a plurality of items are presented on display; an image recognizer which detects that at least a part of a pre-registered image is contained in the video data, and which recognizes the images therein; an appended data extractor that extracts, from an appended data storage which stores appended data corresponding to each of the plurality of images recognized by the image recognizer, the appended data of each image; an appended data display that displays the appended data of each image extracted by the appended data extractor at each relevant image position of the video data; and a display controller that switches, in response to a user operation, a process from a process of successively displaying, on a display of a mobile terminal, a synthesized video based on synthesized video data sequentially acquired by the appended data display to a process of fixedly displaying, as a still image, the synthesized video at a time point corresponding to the user operation.

A data processing method according to another aspect of the present disclosure is of an information processing device, and the method causes the information processing device to: sequentially acquire video data which is picked up by an imager and which contains at least a part of imaging subject where a plurality of items are presented on display; detect that at least a part of a pre-registered image is contained in the video data, and recognize the images therein; extract, from an appended data storage which stores appended data corresponding to each of the plurality of recognized images, the appended data of each image; display the appended data of each extracted image at each relevant image position of the video data; and switch, in response to a user operation, a process from a process of successively displaying, on a display of a mobile terminal, a synthesized video based on sequentially acquired synthesized video data to a process of fixedly displaying, as a still image, the synthesized video at a time point corresponding to the user operation.

A program according to the other aspect of the present disclosure causes a computer that realizes an information processing device to: sequentially acquire video data which is picked up by an imager and which contains at least a part of imaging subject where a plurality of items are presented on display; detect that at least a part of a pre-registered image is contained in the video data, and recognize the images therein; extract, from an appended data storage which stores appended data corresponding to each of the plurality of recognized images, the appended data of each image; display the extracted appended data of each image extracted at each relevant image position of the video data; and switch, in response to a user operation, a process from a process of successively displaying, on a display of a mobile terminal, a synthesized video based on sequentially acquired synthesized video data to a process of fixedly displaying, as a still image, the synthesized video at a time point corresponding to the user operation.

Any arbitrary combination of the above-explained structural components and conversion of the expressions of the present disclosure among a method, an apparatus, a system, a recording medium, a computer program, etc., are also effective as aspects of the present disclosure.

In addition, it is not always necessary that various structural components of the present disclosure are independent one another, and multiple structural components may be configured as a single unit, a structural component may be configured by multiple units, a structural component may be a part of the other structural component, a part of a structural component may be incorporated in a part of the other structural component, and the like.

Still further, the data processing method and computer program of the present disclosure describe multiple procedures in order, but the described order does not limit the order of executing the multiple procedures. Hence, when the data processing method and computer program of the present disclosure are carried out, the order of multiple procedures can be changed without changing the substantive matter.

Yet further, the multiple procedures of the data processing method and computer program of the present disclosure are not limited to a case in which those are executed at different timings from one another. Hence, the other procedure may occur during an execution of a procedure, a part of or all of the execution timings of a procedure and those of the other procedure may overlap, and the like.

Advantageous Effects of Invention

According to the present disclosure, it becomes possible to provide an information processing device, a data processing method thereof, and a program that can improve the operability at the time of information viewing through a mobile terminal.

BRIEF DESCRIPTION OF DRAWINGS

The aforementioned objective, other objectives, features and advantageous effects will become more apparent upon reviewing preferred embodiments to be discussed below and accompanying drawings, in which:

FIG. 7 is a diagram illustrating an example structure of an item master of the information processing device according to the exemplary embodiment of the present disclosure;

DESCRIPTION OF EMBODIMENTS

Figure 1:
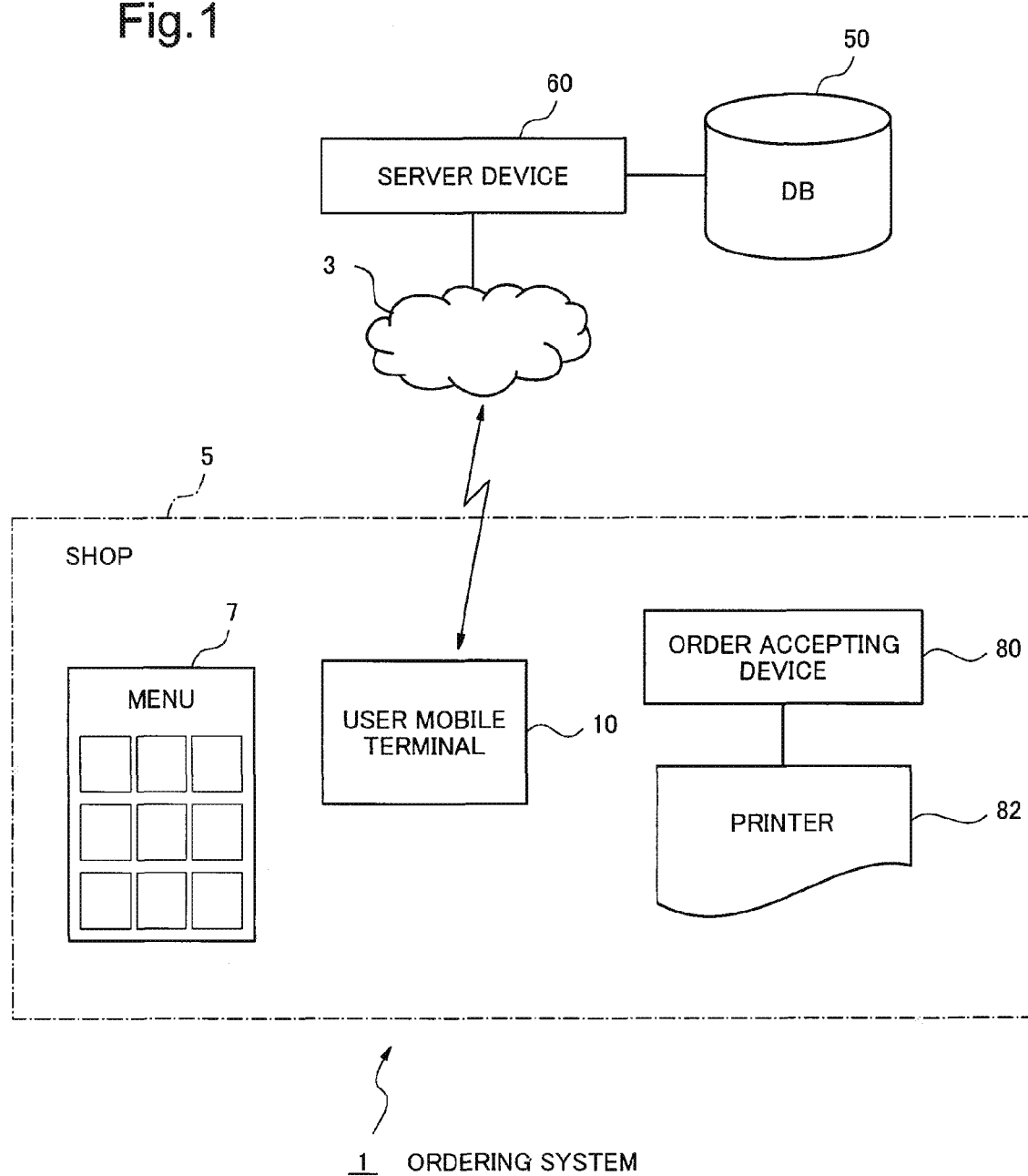
FIG. 1 is a block diagram illustrating an example structure of an ordering system utilizing an information processing device according to an exemplary embodiment of the present disclosure.

Exemplary embodiments of the present disclosure will be explained below with reference to the drawings. The same structural component will be denoted by the same reference numeral throughout all figures, and the duplicated explanation thereof will be omitted accordingly. In addition, in the following respective figures, a structure of a component not essential to the present disclosure will be omitted and unillustrated.

(First Exemplary Embodiment)

FIG. 1 is a block diagram illustrating an example structure of an ordering system 1 utilizing an information processing device of this exemplary embodiment of the present disclosure.

The ordering system 1 utilizing the information processing device of this exemplary embodiment includes a user mobile terminal 10 to be utilized by a user, an order accepting device 80 provided at a store 5, a printer 82 connected with the order accepting device 80, a server device 60 communicable with the user mobile terminal 1 and the order accepting device 80 via a network 3, and a database 50 connected with the server device 60.

Figure 3:
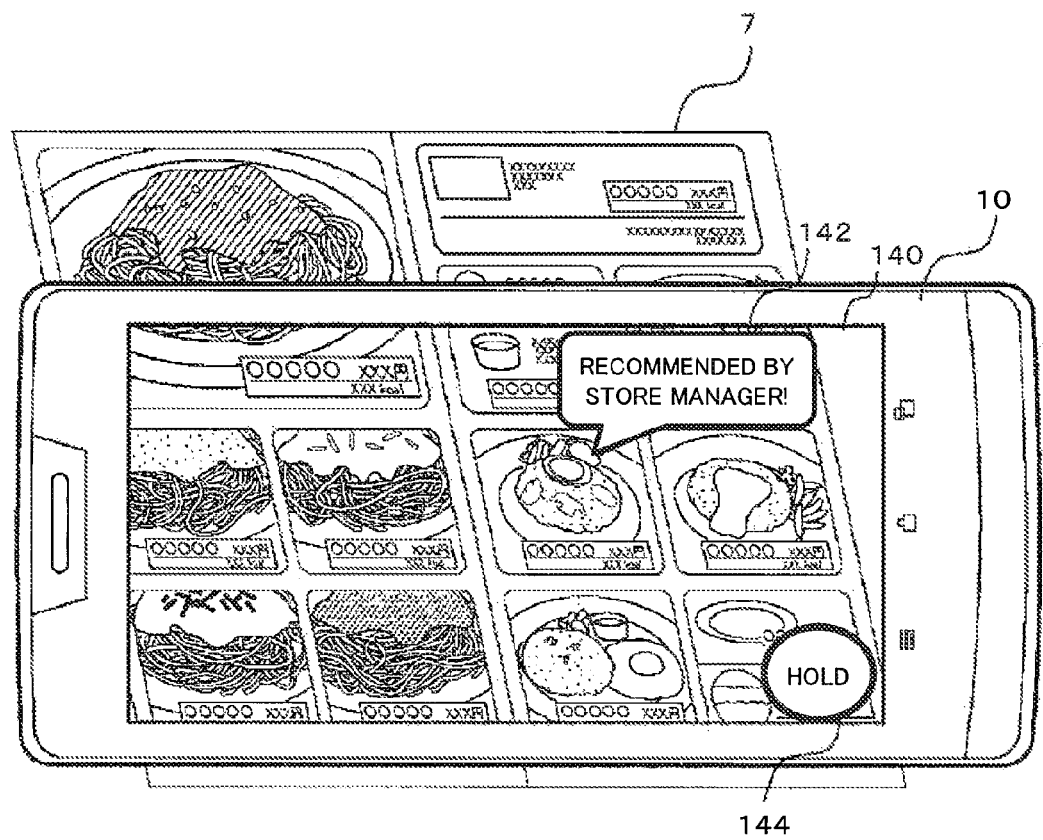
FIG. 3 is a diagram for explaining an information browsing scene while utilizing a user mobile terminal that is the information processing device of the exemplary embodiment of the present disclosure.

According to the ordering system 1 of this exemplary embodiment of the present disclosure, as illustrated in FIG. 3, the user mobile terminal 10 utilized by the user is held over a menu 7 to pick up an image, and a commercial item can be ordered over a preview screen 140 that is a video displayed in a real-time manner. In this exemplary embodiment, an explanation will be given of an example case in which the information processing device 1 is applied to the ordering system 1 in, for example, a restaurant, but the present disclosure is not limited to this case. The system of this exemplary embodiment may be a system which recognizes an image from video data of an imaging subject having arbitrary items presented on display, and which presents, to the user, appended data relevant to the image.

In addition, according to this exemplary embodiment, an explanation will be given of an example case in which the user mobile terminal 10 is a smartphone, but the present disclosure is not limited to this case. For example, the mobile terminal of the present disclosure may be a portable and mobile wireless communication terminal, such as a mobile phone, a PDA (Personal Digital Assistance), a tablet terminal, a gaming machine, or other electronic hardware in addition to the smartphone. Moreover, the mobile terminal of the present disclosure may be a mobile terminal installed at a store or a commercial item presenting space, etc., in addition to the mobile terminal carried by the user, and may be a terminal that can be commonly utilized by users who are visiting the store or the presenting space.

Still further, according to this exemplary embodiment, an explanation will be given of an example case in which a commercial item is ordered through the menu 7 at the store 5 like a restaurant of food-service industries. According to the present disclosure, the subject over which the user holds the user mobile terminal 10 and which is subjected to an image-pickup includes the menu 7, print advertisements, such as a product brochure a leaflet, and an advertisement on a magazine, a commercial item or a product model presented on display and exhibition in a shop window or a store shelf, a screen displaying a digital product brochure on the display of a terminal like a personal computer, or product information displayed on a digital signage placed on the street or in a store. According to this exemplary embodiment, the order accepting device 80 is placed at the store, but the present disclosure is not limited to this case. For example, an order acceptor of the present disclosure may be a virtual store provided over the server device 60 or may be an online shop on a website.

The information processing device according to this exemplary embodiment of the present disclosure can improve the operability when, in particular, an imaging subject having multiple items arranged side by side is picked up part by part while changing the direction of the camera and the position thereof, and the picked-up images are sequentially viewed through a screen in a mobile-terminal size like the user mobile terminal 10.

The items presented on display in the imaging subject include, in addition to articles like commercial items, articles not for sale, such as a floor sample and a preproduction. In addition, the items include options of articles, e.g., elimination of green horseradish paste from a Japanese SUSHI, selectable parts constituting an article, e.g., aero parts for an automobile, and a combination thereof, and the like. Still further, the items may include, other than articles, services provided by various businesses, options thereof, or a designation of date and hour for a service, and an appointment of a person in charge for that service, etc. Yet further, the items may be decision branches of answers of a questionnaire or a quiz which presents multiple decision branches to the user to allow the user to specify equal to or greater than one arbitrary decision branches.

Figure 2:
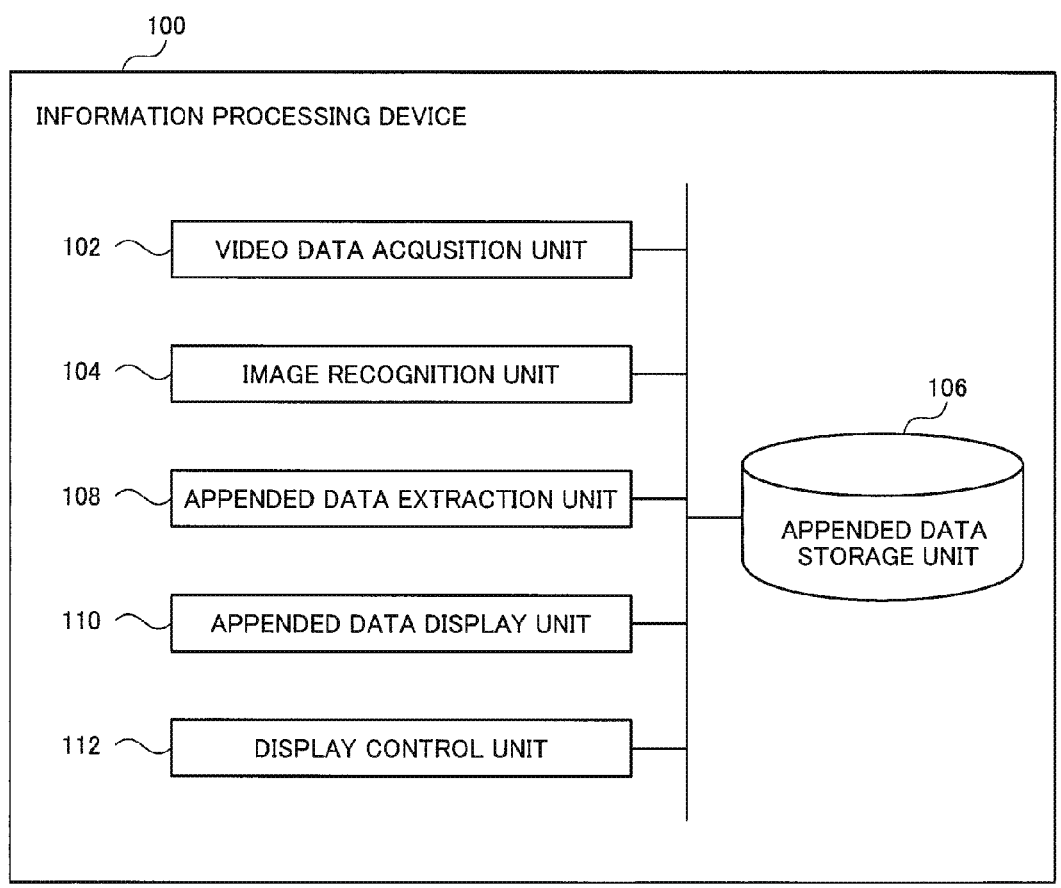
FIG. 2 is a functional block diagram illustrating a logical structure of the information processing device according to the exemplary embodiment of the present disclosure.

FIG. 2 is a functional block diagram illustrating a logical structure of the information processing device 100 according to this exemplary embodiment of the present disclosure.

The information processing device 100 of this exemplary embodiment of the present disclosure includes a video data acquisition unit 102 that sequentially acquires video data of at least a part of imaging subject having multiple items presented on display and imaged by an image unit 30 (see FIG. 4), an image recognition unit 104 which detects that at least a part of pre-registered image is contained in video data, and which recognizes such the images therein, an appended data storage unit 106 that stores appended data corresponding to each of the multiple images recognized by the image recognition unit 104, an appended data extraction unit 108 that extracts the appended data of each image from the appended data storage unit 106, an appended data display unit 110 that displays the appended data of each image extracted by the appended data extraction unit 108 at each relevant image position of the video data, and a display control unit 112 that switches, in response to a user operation, a process of successively displaying, on a display 26 (see FIG. 4) of the user mobile terminal 10, a synthesized video based on synthesized video data sequentially acquired by the appended data display unit 110 to a process of fixedly displaying, on the display 26 of the user mobile terminal 10, a synthesized video as a still image at a time point corresponding to the user operation.

As will be discussed later in detail for each structural component, the information processing device 100 of this exemplary embodiment of the present disclosure can be realized by the user mobile terminal 10, or the server device 60 communicable with the user mobile terminal 10, or the combination thereof.

When an application program to realize the information processing device 100 of this exemplary embodiment of the present disclosure is installed in advance in the user mobile terminal 10, at least some functions of the information processing device 100 can be realized on the user mobile terminal 10. Alternatively, a website may be provided on a web server (unillustrated), and the user mobile terminal 10 is allowed to utilize the functions of the information processing device 100 when the user accesses the website through the user mobile terminal 10.

Figure 4:
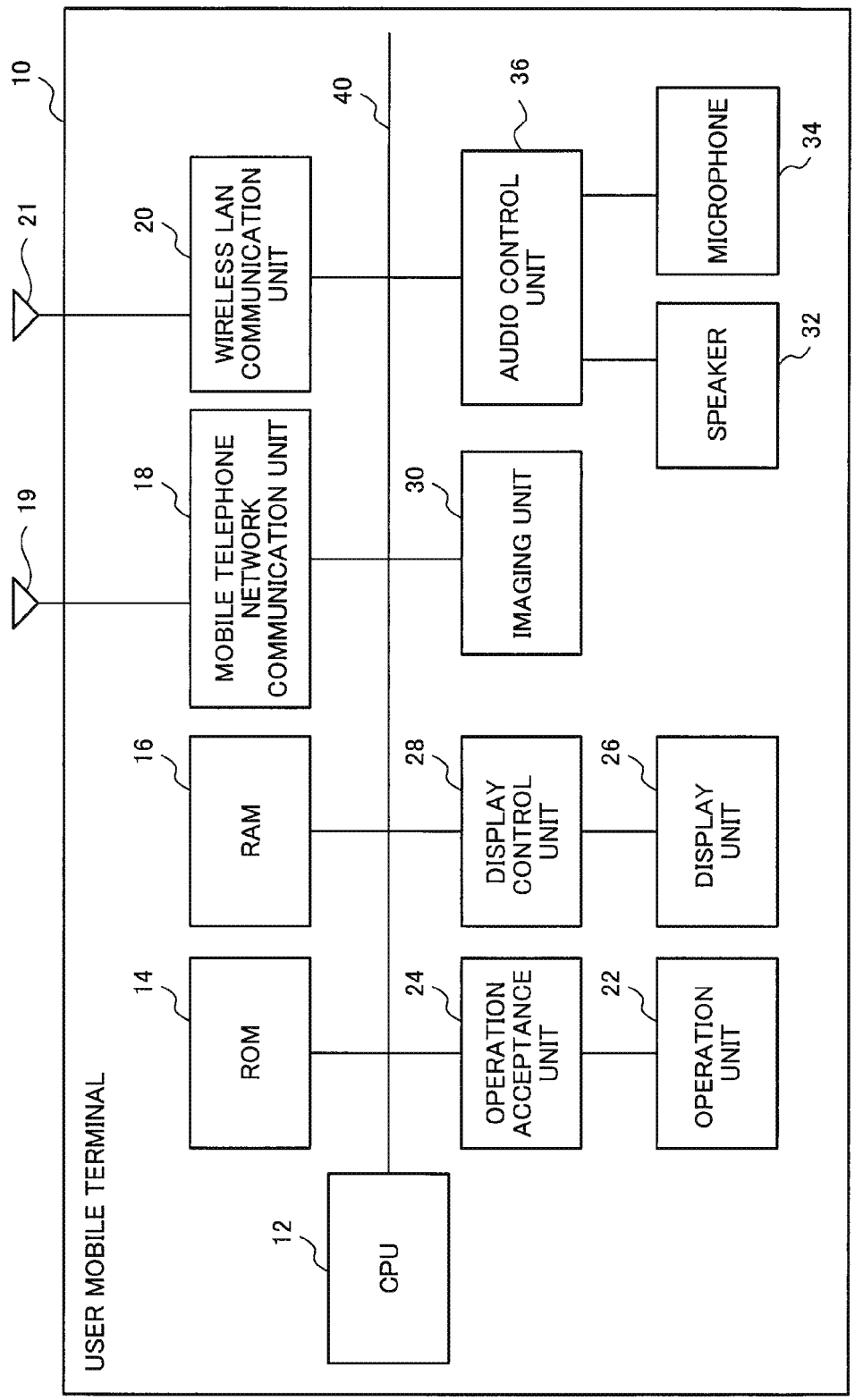
FIG. 4 is a block diagram illustrating a hardware configuration of the user mobile terminal that is the information processing device according to the exemplary embodiment of the present disclosure.

FIG. 4 is a block diagram illustrating a hardware configuration of the user mobile terminal 10 that is the information processing device 100 according to this exemplary embodiment of the present disclosure. As illustrated in FIG. 4, the user mobile terminal 10 of this exemplary embodiment includes a CPU (Central Processing Unit) 12, a ROM (Read Only memory) 14, a RAM (Random Access Memory) 16, a mobile-phone-network communication unit 18, a wireless LAN (Local Area Network) communication unit 20, an operation unit 22, an operation acceptance unit 24, the display unit 26, the display control unit 28, the image unit 30, a speaker 32, a microphone 34, and a sound control unit 36.

The CPU 12 is connected with respective units of the user mobile terminal 10 through a bus 40, and controls the whole user mobile terminal 10 together with the respective units. The ROM 14 stores a program to operate the user mobile terminal 10, various application programs, and various setting data utilized when those programs are executed, and, address data, and a user data containing various contents data. The RAM 16 includes an area temporarily storing data like a work area to execute the program.

The respective structural components of the user mobile terminal 10 can be realized by an arbitrary combination the hardware of an arbitrary computer including the CPU 12, the RAM 16, the program loaded in the RAM 16 to realize at least a part of the structural components illustrated in FIG. 2, the ROM 14 storing such a program, and a network connection interface (mobile-phone-network communication unit 18 and wireless LAN communication unit 20) with a software. It should be understood by those skilled in the art that various modifications can be made to the way of realization and the realization hardware. The functional block diagram for each exemplary embodiment to be discussed below illustrates not a hardware-by-hardware configuration, but a logical block for each function.

Note that the above-explained ROM 14 and RAM 16 may be other devices that have a function of storing an application program, setting data to execute the program, temporary-stored data, and user data, such as a flash memory and a disk drive.

The operation unit 22 includes an operation key, an operation button, a switch, a jog dial, a touch pad, and a touch panel integrated with the display unit 26. The operation acceptance unit 24 accepts an operation given to the operation unit 22 by the user, and notifies the CPU 12 of this acceptance. The display unit 26 includes an LED (Light Emitting Diode) display, a liquid crystal display, or an organic EL (Electro Luminescence) display, or the like. The display control unit 28 displays various screens on the display unit 26 in accordance with an instruction from the CPU 12. The sound control unit 36 outputs sound from the speaker 32, and inputs sound through the microphone 34 in accordance with an instruction from the CPU 12.

The user mobile terminal 10 is connected with, through a base station (unillustrated), a mobile communication network (unillustrated) using the mobile-phone-network communication unit 18 and a mobile-phone-network antenna 19 in, for example, a 3G (3rd Generation: third generation mobile phone) scheme to establish a communication. The user mobile terminal 10 is connected with the network 3 (see FIG. 1) like the Internet through the mobile communication network, and becomes able to communicate with the server device 60 (see FIG. 1).

The wireless LAN communication unit 20 performs wireless LAN communication with a relay device (unillustrated) through a wireless LAN antenna 21 in a scheme compatible with, for example, the IEEE 802.11 standard. In this exemplary embodiment, the user mobile terminal 10 performs wireless LAN communication with a relay device placed in the store 5 through the wireless LAN communication unit 20 so as to be connected with an in-store network (unillustrated), thereby becoming able to communicate with the order accepting device 80 connected with the in-store network.

Figure 5:
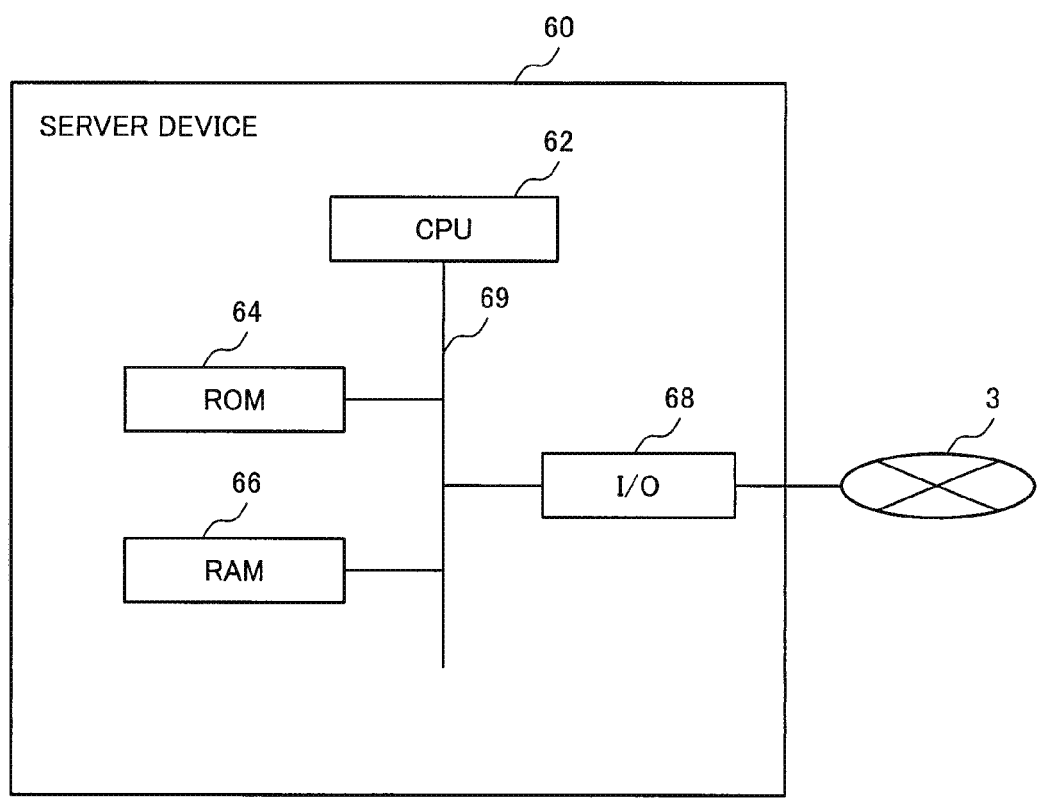
FIG. 5 is a block diagram illustrating a hardware configuration of a server device that is the information processing device according to the exemplary embodiment of the present disclosure.

FIG. 5 is a block diagram illustrating a hardware configuration of the server device 60 of the ordering system 1 according to this exemplary embodiment of the present disclosure.

The server device 60 of this exemplary embodiment can be realized by a server computer, a personal computer or an equivalent device thereto, connected with the database 50 (see FIG. 1). In addition, the server device 60 may be a virtual server.

The respective structural components of the server device 60 of the ordering system 1 according to this exemplary embodiment can be realized by an arbitrary combination of the hardware of an arbitrary computer including a CPU 62, a RAM 66, a program loaded in the RAM 66 to realize at least a part of structural components illustrated in FIG. 2, a ROM 64 storing such a program, and an I/O (Input/Output) 68 including a network connection interface with a software. The CPU 62 is connected with the respective components of the server device 60 through a bus 69, and controls the whole server device 60 together with the respective components. It should be understood by those skilled in the art that various modifications can be made to the way of realization and the realization hardware. The functional block diagram for each exemplary embodiment to be discussed below illustrates not a hardware-by-hardware configuration, but a logical block for each function. The server device 60 may be connected with an unillustrated input/output device through the I/O 68.

Returning to FIG. 2, in the information processing device 100 of this exemplary embodiment, the video data acquisition unit 102 sequentially acquires video data picked up by an imager (image unit 30 of user mobile terminal 10 in FIG. 4) and containing images of at least a part of imaging subject where multiple items are presented on display. For example, the user holds the user mobile terminal 10 over the menu 7 (see FIG. 3), and causes the user mobile terminal to display, as a real-time video, at least a part of images of the multiple commercial items presented on the menu 7 on a preview screen 140 (see FIG. 3) that is displayed on the display unit 26 (see FIG. 4) of the user mobile terminal 10 in a live-view condition.

For example, the video data acquisition unit 102 of this exemplary embodiment picks up images of at least a part of the imaging subject, and sequentially acquires video data in a mobile-terminal-screen size that can be displayed on the screen of a mobile terminal.

In the above-explained exemplary embodiment, the video data acquisition unit 102 is realized by a camera (image unit 30, etc., in FIG. 4) built in or connected with the user mobile terminal 10, but the present disclosure is not limited to this structure. In another exemplary embodiment, the video data acquisition unit 102 can be realized by the server device 60. Video data acquired by a video data acquisition unit 102 of the server device 60 may be subjected to streaming-distribution to the user mobile terminal 10 of the user, and may be displayed on the display unit 26 (see FIG. 4) of the user mobile terminal 10. In addition, the server device 60 may be operated remotely from the user mobile terminal 10, and video data picked up by the video data acquisition unit 102 of the server device 60 may be subjected to streaming-distribution to the user mobile terminal 10, and may be displayed on the display unit 26 of the user mobile terminal 10. Alternatively, as the video data acquisition unit 102, a live-camera may be utilized to acquire video data containing picked-up images of the shop window of a store through a remote operation from the user mobile terminal 10, and the acquired video data may be subjected to streaming distribution to the user mobile terminal 10 via the server device 60, and may be displayed on the display unit 26 of the user mobile terminal 10.

The image recognition unit 104 detects that at least a part of pre-registered images is contained in the video data, and recognizes the images therein.

As to the image detection technology, there are two methods.

In a first method, the image recognition unit 104 checks, through a pattern recognition, etc., the feature quantity in the video image with the feature quantity (feature point data) of an image of an item registered in advance in an image table 460 (see FIG. 8), and detects at least partially matching area to specify the position of the area and the image thereof, thereby specifying the item corresponding to this image.

In a second method, the image recognition unit 104 detects, through a pattern recognition, etc., that images of multiple items are contained in the video image, separates an area that is possibly the image of each item in the video image, extracts the feature quantity of each separated area, checks this feature quantity with the feature quantity (feature point data) in the image table 460 (see FIG. 8) to specify the position of at least partially matching area and the image thereof, thereby specifying the item corresponding to this image.

In an image recognition process, it is not necessary that the feature quantity (feature point data) of the image of an item in the image table 460 (see FIG. 8) is completely consistent with the feature quantity in the video image, and at least a partial matching is acceptable. Even if, for example, only a part of the image of the item is within the imaging range in the video image, the image recognition unit 104 can specify the image.

Note that according to the first method, a process of dividing the video image into areas of images of respective items is unnecessary. Hence, the first method is more suitable.

In this exemplary embodiment, it is desirable that the image recognition unit 104 should be capable of simultaneously recognizing multiple images from the video data. In addition, the image recognition unit 104 specifies, on the display screen, the position of the image on the video data.

The image recognition unit 104 can be realized by either the user mobile terminal 10 or the server device 60. The information processing device 100 possesses the image table 460 (see FIG. 8) storing the feature points of the image of an item in association with the identification information thereof. For example, the image table 460 may be stored in the database 50 of the server device 60, the ROM 14 of the user mobile terminal 10, or a recording medium readable by the user mobile terminal 10 and loaded therein (hereinafter, referred to as "memory of user mobile terminal 10" as abbreviated expression of the ROM and the recording medium).

The image table 460 stores, in association with each other, an item ID that is the identification information of the item, and the feature point data of the image of the item. The image recognition unit 104 refers to the image table 460, thereby acquiring the item ID corresponding to the feature points of the image extracted from the video data.

The appended data storage unit 106 stores appended data corresponding to each of the multiple images contained in the video data. In this exemplary embodiment, the database 50 of the server device 60 stores an item master 430 illustrated in FIG. 7. The item master 430 contains, for example, the item ID that is the identification information of an item, the name of the item, the unit price of the item, a price with tax, allergy substance information of the ingredient when the item is a food, and coupon information related to the item, etc.

Figure 8:
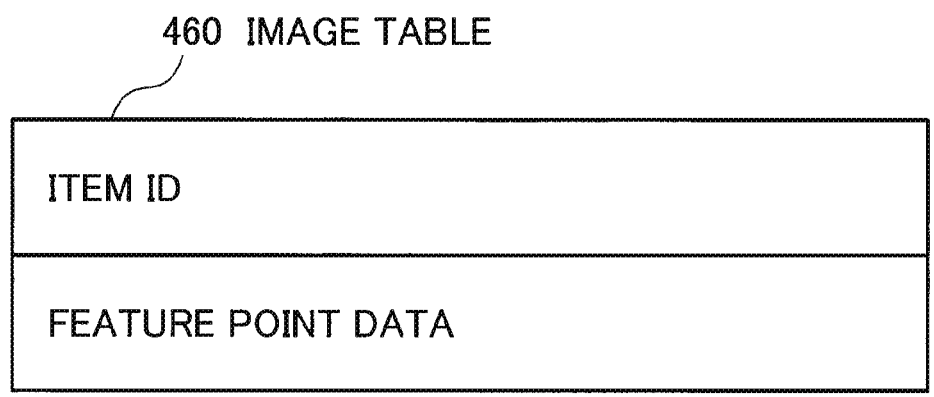
FIG. 8 is a diagram illustrating an example structure of an image table of the information processing device according to the exemplary embodiment of the present disclosure.

Note that in this exemplary embodiment, the image table 460 in FIG. 8 employs a data structure in which the feature point data of an image is stored in association with the item ID, but the present disclosure is not limited to this data structure. The image table 460 may simply store the identification information of an image in association with the feature point data, and the item master 430 may store, for each identification information of the image, information related to the image in association with each other.

In addition, the image table 460 may store, in association with each other, the feature point data of the image and the appended information corresponding thereto, and the appended data corresponding to the feature point data of the image may be referred without a process of referring the item master 430 illustrated in FIG. 7.

In this exemplary embodiment, the appended data storage unit 106 is contained in the database 50 of the server device 60, but may be contained in the memory of the user mobile terminal 10. In addition, the update information on the appended data may be transmitted to the user mobile terminal 10 from the server device 60, and the information processing device 100 may update the appended data possessed by the user mobile terminal 10. Alternatively, the information processing device 100 may selectively download appended data necessary for the user to the user mobile terminal 10 from the server device 60, and the selectively downloaded data may be stored in the appended data storage unit 106.

The appended data extraction unit 108 extracts, based on the image detected by the image recognition unit 104, appended data corresponding to each image specified by the image recognition unit 104 from the appended data storage unit 106. As explained above, the appended data storage unit 104 may be included in both of the user mobile terminal 10 and the server device 60, and the appended data extraction unit 108 may access the server device 60 to acquire the appended data when unable to extract the appended data corresponding to the image upon searching in the appended data storage unit 106 of the user mobile terminal 10.

The appended data display unit 110 displays the appended data of each image extracted by the appended data extraction unit 108 at a position corresponding to that image on the video data. The appended data display unit 110 expresses the appended data of the image as, for example, a balloon, a pop-up window or various objects like replacement images, all containing icons and texts, and displays such an expression on the video data.

The appended data display unit 110 can be realized by the user mobile terminal 10 or the combination of the user mobile terminal 10 with the server device 60.

The image recognition unit 104, the appended data extraction unit 108, and the appended data display unit 110 can be realized by applying, for example, a technology called Augmented Reality (AR) that can append and present information with a reality environment picked up by a camera, etc., using a computer. When the AR is applied, the information processing device 100 can recognize, on the video picked up by the camera of the user mobile terminal 10, etc., a three-dimensional coordinate system of an XY plane that is an area where a specified image registered in advance like a product image is displayed, and display the corresponding appended data on the display unit 26 as a three-dimensional object or the like.

The appended data to be displayed may include recommendation information, discount information, coupon information, allergy information, evaluation information, or option-service information all related to the image.

When, for example, the imaging subject is the menu 7 (see FIG. 3), the appended data may include recommendation information, discount information, coupon information, the URL address of a homepage on which information, such as a calorie, ingredients (allergy information) and the details of a commercial item, is posted, word-of-mouth information of the commercial item, and the evaluation, etc., by a customer or a critical writer.

In addition, the appended data may contain, as the unique information to a store, an area-limited menu, a recommended menu by a store manager, limited-time store visitation points, and sold-out information on a commercial item, and the like. Still further, in accordance with the date and hour and the weather, the appended data may contain day-by-day information, and information on a time (daily, weekly, monthly) sale, season sale, and rainy-day only sale, etc.

The appended data may be an arbitrary combination of the pieces of data exemplified above.

The appended data displayed on the video data may be an icon that indicates the presence of the appended data. The appended data display unit 110 may display the detail information on the image when the icon is operated. That is, the appended data display unit 110 is capable of displaying the appended data on the product image that cannot be printed on a product brochure and the like due to space limitation, etc. The information processing device 100 posts the minimum requisite information or only the information on an item (image) that needs to get an attention from the user on the imaging subject in this way, and presents detail information only on the item (image) getting an attention from the user, thereby effectively advertising and promoting the sales.

The user directs the image unit 30 toward at least a part of the imaging subject like a product brochure or the menu 7 where a large number of items are presented on display, picks up the images thereof, causes the user mobile terminal 10 to display the multiple images on the display unit 26 thereof in a mobile-terminal size, and selects an image among those displayed images. For example, the user pans the image unit 30 of the user mobile terminal 10 within the range of the imaging subject, and can check the image of the whole imaging subject while checking the appended data of each image displayed on a real-time video that is displayed on the display unit 26 through the panning.

The display control unit 112 switches, in response to a user operation, a process of successively displaying, on the display unit 26 (see FIG. 4) of the user mobile terminal 10, a synthesized video based on the synthesized video data sequentially acquired by the appended data display unit 110 to a process of fixedly displaying, as a still image, a synthesized video at a time point corresponding to the user operation on the display unit 26 of the user mobile terminal 10.

The display control unit 112 can be realized by the user mobile terminal 10 or the combination of the user mobile terminal 10 with the server device 60.

As illustrated in FIG. 3, in the preview screen 140 that is displayed on the display unit 26 of the user mobile terminal 10, a live-view video of at least a part of the menu 7 is displayed. Next, a synthesized video containing the appended data (in FIG. 3, a balloon 142) of the specified image by the image recognition unit 104 is displayed in the preview screen 140. In addition, the preview screen 140 includes a hold button 144 to accept a user operation for causing the display control unit 112 to switch the process.

In this exemplary embodiment, a structure is employed in which the preview screen 140 is provided with the hold button 144 to accept a user operation, but the present disclosure is not limited to this structure. For example, the function of the hold button 144 may be allocated to a switch, an operation button, etc., of the user mobile terminal 10 to accept the user operation therethrough. In addition, a structure in which the user operation is accepted through other interfaces is also applicable.

For example, the same function as that of the hold button 144 may be realized in accordance with an inputting of a speech command, such as "hold" or "cancel", by the user through the microphone and a speech recognition function built in the user mobile terminal. Alternatively, when the user mobile terminal is provided with an acceleration sensor function, the same function as that of the hold button 144 may be realized upon execution of a predetermined operation by the user that can be detected by the acceleration sensor like a waving operation of the terminal up and down twice.

A successive display of the video image and the fixed display thereof is switched in accordance with the operation accepted through the hold button 144. Various operation methods are possible as explained below.

A first operation method is an application of the hold button 144 that is a toggle switch which switches a display every time the user depresses such a switch. In this case, the depression of the hold button 144 by the user is a display switch operation.

A second operation method is a utilization of the touch panel of the user mobile terminal 10 for the operation. In this case, a continuous tap operation on the surface of the touch panel displayed on the preview screen 140 is the operation to maintain the fixed display for this time period.

According to a third operation method, a successive display is maintained while the hold button 144 is being depressed by the user, and a fixed display is performed when the finger is released from the hold button 144.

According to a fourth operation method, a fixed display is maintained while the hold button 144 is depressed by the user, and a successive display is performed when the finger is released from the hold button 144.

In addition, while the display control unit 112 is executing the process of fixed display, at least a part of the video data acquisition unit 102, the image recognition unit 104, the appended data extraction unit 108, and the appended data display unit 110 may suspend its operation.

An explanation will be given of, for example, a case in which the display is switched through the above-explained third operation method. First, a successive display is maintained while the hold button 144 is depressed. While at the same time, the appended data display unit 110 successively displays, at the position of the image recognized by the image recognition unit 104, the appended data extracted by the appended data extraction unit 108 on the video picked up by the video data acquisition unit 102. Subsequently, when the operation to the hold button 144 is canceled, e.g., when the user releases the finger from the hold button 144, a fixed display is performed. At this time, the display control unit 112 fixedly displays the synthesized image that displays the appended data of the recognized image on the video at this time point. In addition, the video data acquisition unit 102, the image recognition unit 104, the appended data extraction unit 108, and the appended data display unit 110 suspends the respective operations.

According to this structure, an unnecessary process for a fixed display operation is not performed, and thus the process and communication loads to the information processing device 100 can be reduced, resulting in an excellent efficiency. In addition, the power consumption by the information processing device 100 can be also reduced. This structure is especially effective since the process of the server 60 where the loads are concentrated can be reduced when the process of the information processing device 100 is executed on the server device 60, and the large number of user mobile terminals 10 are accessing the server device 60 for executing the respective processes.

According to the information processing device 100 of this exemplary embodiment, when the user mobile terminal 10 or the CPU 62 of the server device 60 executes various process operations corresponding to the computer programs, various units as explained above are realized as various functions.

A computer program of this exemplary embodiment is described to cause a computer that realizes the information processing device 100 to execute a step of sequentially acquiring video data picked up by the image unit 30 (see FIG. 4) and containing at least a part of imaging subject where multiple items are presented on display, a step of detecting that at least a part of a pre-registered image is contained in the video data, and recognizing the images therein, a step of extracting appended data of each recognized image from the appended data storage unit 106 that stores the appended data corresponding to respective multiple recognized images, a step of displaying the extracted appended data of each relevant image position on the video data, and a step of switching a process from a process of successively displaying, in response to a user operation, a synthesized video based on sequentially acquired synthesized video data on the display unit 26 (see FIG. 4) of the user mobile terminal 10 to a process of fixedly displaying, as a still image, the synthesized video at the time point corresponding to the user operation on the display unit 26 of the user mobile terminal 10.

The computer program of this exemplary embodiment may be recorded in a computer-readable recording medium. The recording medium is not limited to any particular one, and the recording medium in various forms are applicable. In addition, the program may be loaded in the memory of the computer from the recording medium, or may be downloaded in the computer through a network, and loaded in the memory of the computer.

Figure 6:
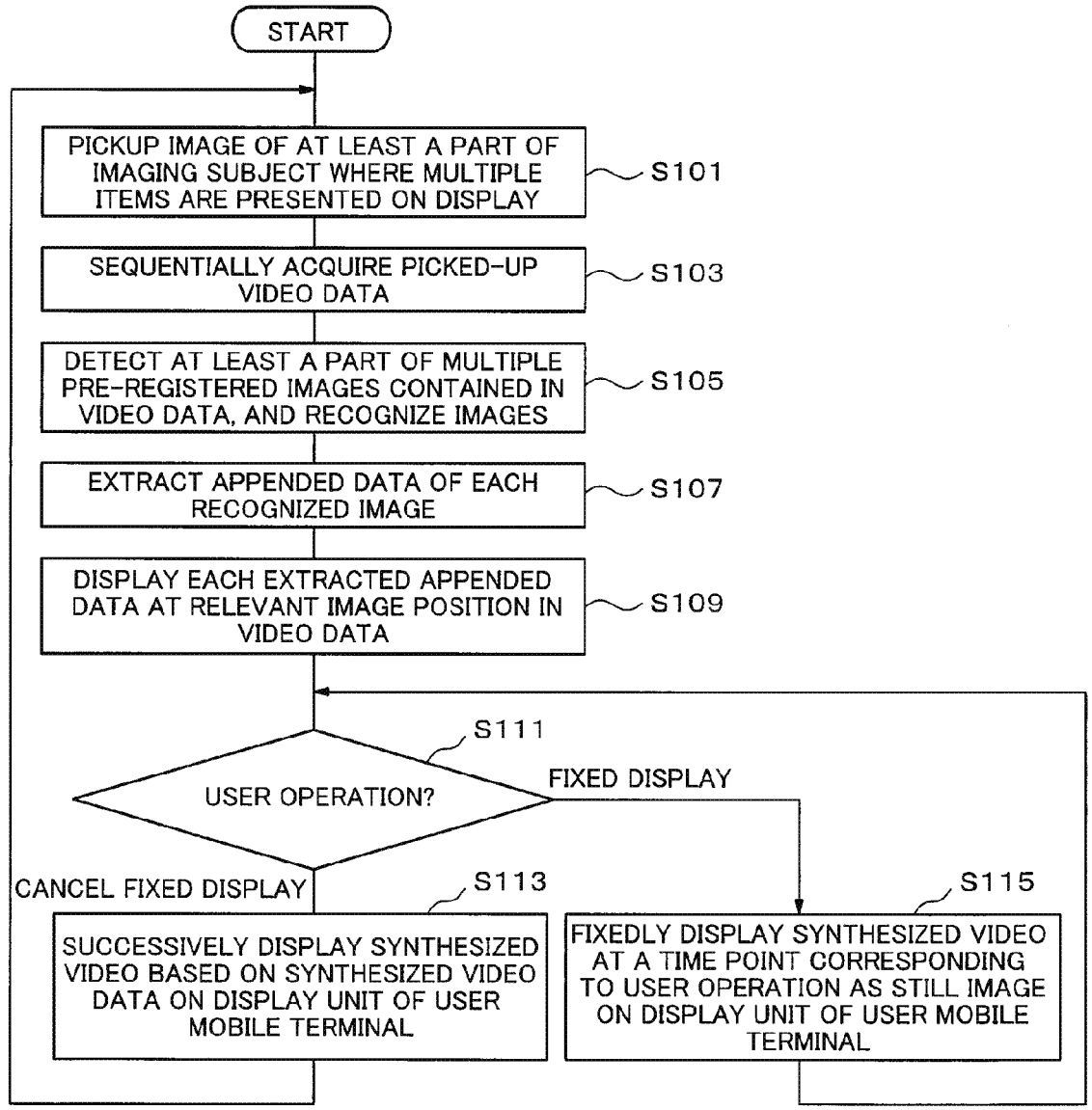
FIG. 6 is a flowchart illustrating an example operation of the information processing device according to the exemplary embodiment of the present disclosure.

An explanation will be below given of the data processing method by the information processing device 100 employing the above-explained structure according to this exemplary embodiment. FIG. 6 is a flowchart illustrating an example operation of the information processing device 100 of this exemplary embodiment. As explained above, the information processing device 100 of this exemplary embodiment of the present disclosure can be realized by the user mobile terminal 10 and the sever device 60. In addition, various ways of the process share by the user mobile terminal 10 and the server device 60 are possible. The flowchart of FIG. 6 illustrates an example process procedure of the whole information processing device 100.

In the information processing device 100 of this exemplary embodiment, first, the video data acquisition unit 102 picks up (step S101 images of at least a part of imaging subject where multiple items are presented on display through the image unit, and sequentially acquires (step S103) picked-up video data. Next, the image recognition unit 104 detects that at least a part of the pre-registered image is contained in the video data, and recognizes (step S105) the images therein.

Subsequently, the appended data extraction unit 108 extracts (step S107), from the appended data storage unit 106 that stores the appended data corresponding to each of the multiple images recognized by the image recognition unit 104, the appended data of each image.

Thereafter, the appended data display unit 110 displays (step S109) the appended data of each image extracted by the appended data extraction unit 108 at a position corresponding to each image in the video data.

Subsequently, the display control unit 112 switches (step S111), in response to a user operation, a process from a process (step S113) of successively displaying, on the display unit 26 of the user mobile terminal 10, the synthesized video based on the synthesized video data sequentially acquired by the appended data display unit 110 to a process (step S115) of fixedly displaying, as a still image, the synthesized video at the time point corresponding o the user operation on the display unit 26 of the user mobile terminal 10.

More specifically, an explanation will be given of a case in which, for example, the hold button 144 in FIG. 3 is a toggle-switch type. First, the display control unit 112 successively displays (step S113), in the preview screen 140 on the display unit 26 of the user mobile terminal 10, the synthesized video based on the synthesized video data sequentially acquired by the appended data display unit 110. In this condition, the flow of FIG. 6 returns to the step S101 from the step S113, and the processes in the step S101 to the step S113 are repeated until the user operation given to the hold button 144 is detected in the step S111.

Next, when the hold button 144 is depressed (fixed display operation in step S111), the display control unit 112 fixedly displays (step S115), as a still image, the synthesized video at a time point at which the hold button 144 is operated on the display unit 26 of the user mobile terminal 10. Subsequently, the process returns to the step S111, and the display control unit 112 maintains the fixed display until the fixed display is canceled by the user operation, i.e., until the hold button 144 is depressed again. In the example case in FIG. 6, the processes in the step S101 to the step S109 are not executed during this time period.

Next, in this condition, when the hold button 144 is depressed again (to cancel fixed display operation in step S111), the display control unit 112 becomes able to successively display (step S113), in the preview screen 140 on the display unit 26 of the user mobile terminal 10, synthesized video based on the synthesized video data sequentially acquired by the appended data display unit 110.

As explained above, the displaying can be switched through a simple operation, thus the usability is improved.

When the information processing device 100 operates through the above-explained procedures, the following displaying is performed on the user mobile terminal 10.

FIGS. 9 and 10 illustrate the appearance of the preview screen 140 when the user mobile terminal 10 (see FIG. 3) in the information processing device 100 of this exemplary embodiment is held over the menu 7.

Figure 9A:
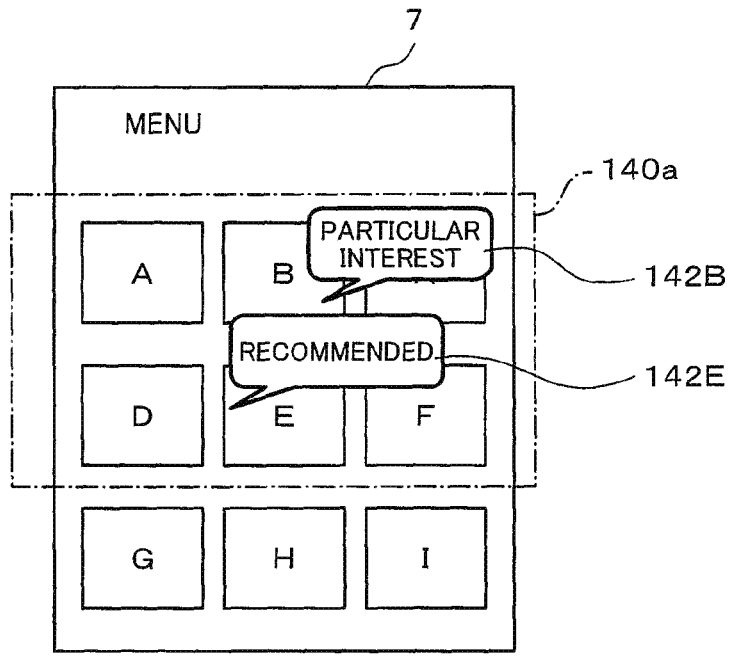
FIGS. 9A and 9B are diagrams for explaining an operation of the information processing device according to the exemplary embodiment of the present disclosure.

The menu 7 has posted thereon images of nine commercial items that are A to I. It is assumed that, when the user holds the user mobile terminal 10 over the menu 7, as illustrated in FIG. 9A, images of the commercial items A to F that are a part of images included in the menu 7 are contained in the video of a preview screen 140a. At this time, pieces of appended data corresponding to the commercial item B and the commercial item E are extracted by the appended data extraction unit 108, and a balloon 142B and a balloon 142E are displayed on the preview screen 140a by the appended data display unit 110.

Figure 9B:
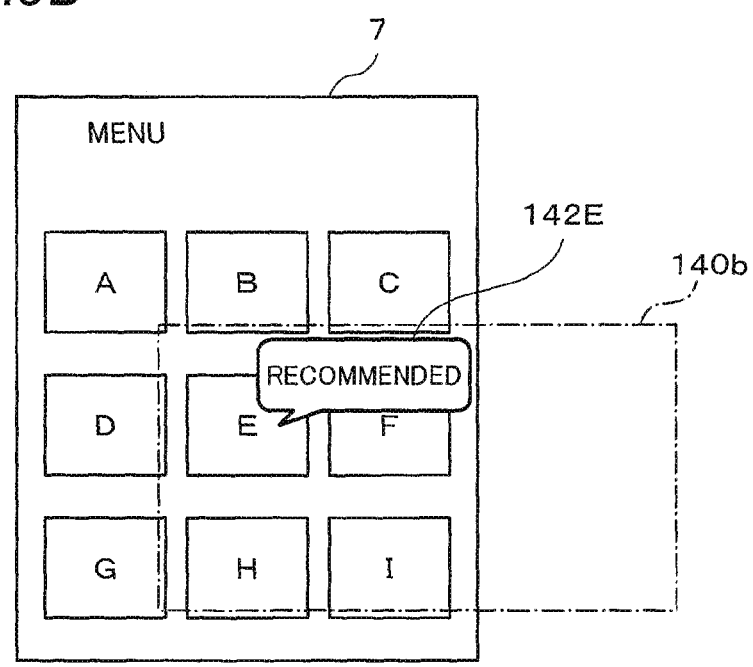

At this time, it is assumed that the user pans the user mobile terminal 10 against the menu 7, and the user mobile terminal is moved to a position in FIG. 9B. The images of the commercial items A to D contained in the preview screen 140a are now out of a preview screen 140b, but the images of the commercial items E, F, H, and I are now contained therein. In this case, the balloon 140B that displays the appended data of the commercial item B which was displayed in the preview screen 140a in FIG. 9A is no longer displayed on the preview screen 140b in FIG. 9B.

As explained above, when, for example, the user holds the user mobile terminal over the menu 7 to view the appended data, the viewable appended data changes depending on the image position. It is no problem if the user pans the user mobile terminal 10 purposefully, but when the image position of the user mobile terminal 10 changes despite the user's intent, the same event occurs. That is, when the user's hand is unstabilized, the image position is displaced, and thus the same event occurs. In addition, when, for example, the user wants the other user to view the appended data, it is necessary for the user to move both of the menu 7 and the user mobile terminal 10 to a position that allows the other user to view the preview screen 140 while maintaining the relative position between the user mobile terminal and the menu. Still further, when, for example, the imaging subject is a digital signage, if the screen of the imaging subject is switched, it becomes difficult to pick up an image thereof, and thus the appended data becomes not viewable.

Figure 10A:
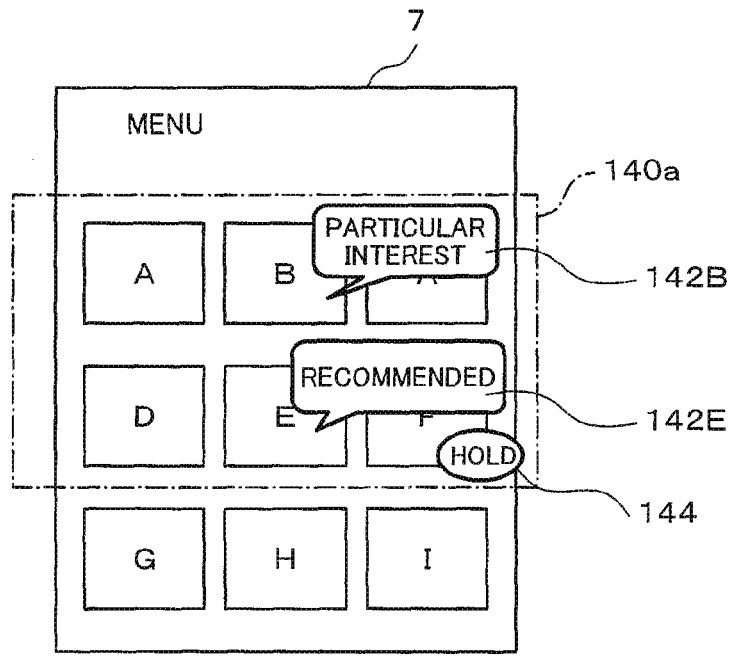
FIGS. 10A and 10B are diagrams for explaining an operation of the information processing device according to the exemplary embodiment of the present disclosure.
Figure 10B:
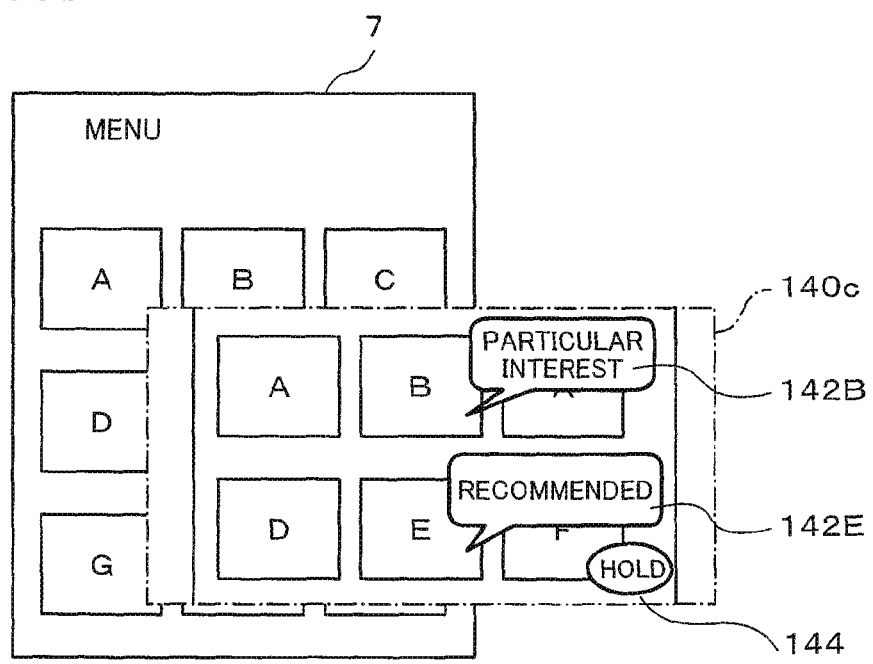

In such a case, according to the information processing device 100 of this exemplary embodiment, upon operation to the hold button 144, the screen is fixedly displayed, and thus the appended data is still viewable even if the image position is displaced. For example, in a condition of the preview screen 140a in FIG. 10A, when the user operates the hold button 144, the information processing device 100 stores the synthesized video at this time point, and fixedly displays a still image. In this condition, even if the user changes the image position of the user mobile terminal 10, as illustrated in FIG. 10B, a preview screen 140c consistent with the preview screen 140a in FIG. 10A is maintained in a fixedly displayed manner. Hence, according to this condition, the user can pass the user mobile terminal 10 only to the other user to allow the other user to view the appended data.

Next, when the other user returns the user mobile terminal 10 to the user, if the user simply holds the user mobile terminal 10 over the menu 7 and depresses the hold button 144, a successive synthesized video is displayed on the preview screen 140. Therefore, the viewing of the appended data of the other image is still possible.

In addition, according to the information processing device 100 of this exemplary embodiment, the display control unit 112 can change, in response to a user operation given to the appended data in the fixedly displayed synthesized video, the way of displaying of the appended data subjected to the user operation in the fixedly displayed video.

Figure 11:
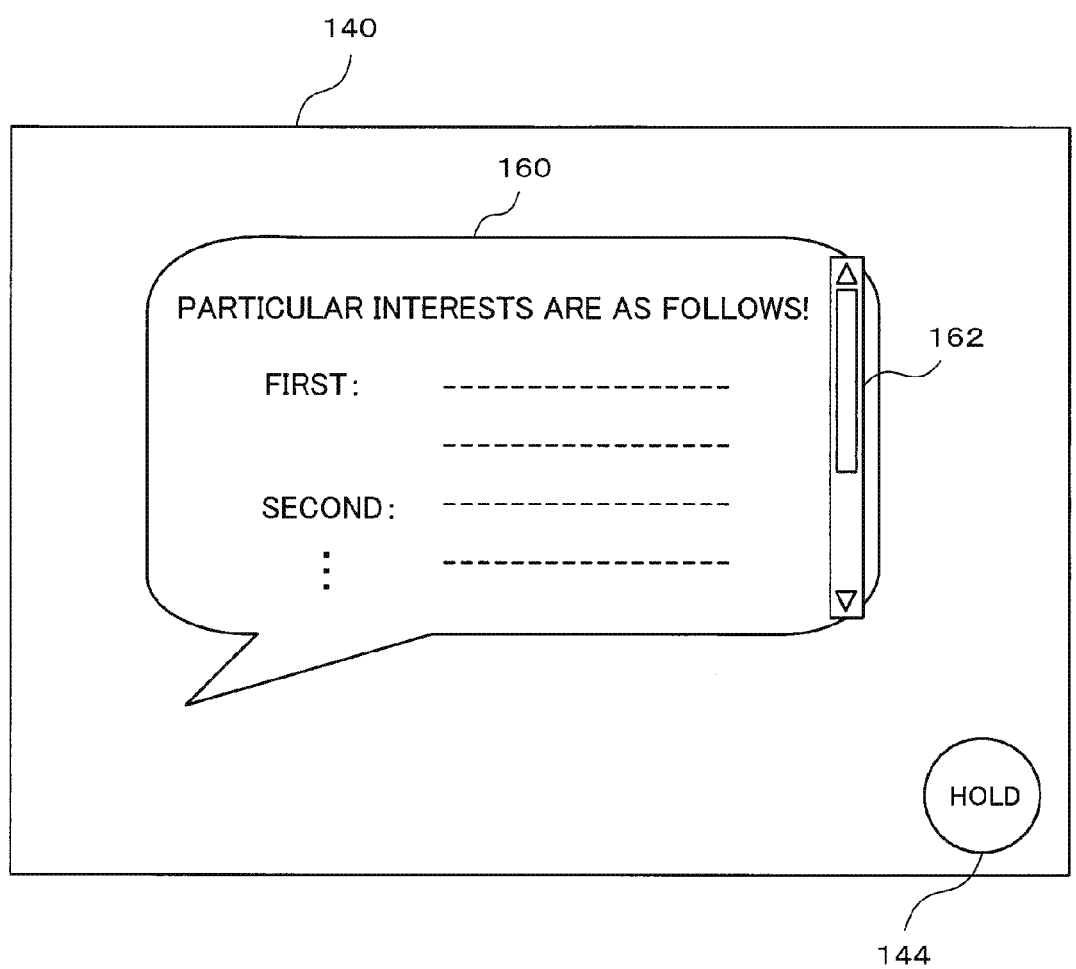
FIG. 11 is a diagram illustrating an example appended data displaying scheme by the information processing device according to the exemplary embodiment of the present disclosure.

When, for example, as illustrated in FIG. 11, the appended data displayed in the video by the display control unit 12 has a long expression described in a balloon 160, as to a portion that is out of the area of the balloon 160, when a scroll bar 162 is provided, the full explanation can be viewed. The user operates this scroll bar 162 to move the texts in the balloon 160 in the vertical direction, enabling the user to view the full texts.

As explained above, when the operation is given to the appended data, the information processing device 100 of this exemplary embodiment enables an operation while stabilizing the synthesized image of the preview screen 140 in a fixedly displayed condition upon operation to the hold button 144, resulting in an excellent operability. When it is difficult to fixedly display the preview screen 140, it is necessary for the user to, while holding the user mobile terminal 10 without an unstabilization of a hand, operate the scroll bar 162 with the other hand, resulting in a poor operability.

In addition, according to the information processing device 100 of this exemplary embodiment, when viewing of the appended data of the fixedly displayed video ends, upon operation to the hold button 144 by the user, the video display is switched again to a successive video display, and thus the appended data of the other image is continuously viewable without a stress.

Still further, according to another example case in which an operation is given to the appended data, when pieces of appended data corresponding to multiple item images displayed on the video are displayed, and are superimposed with other items, the display position of the appended data can be changed in accordance with a user operation. As to the changing method in accordance with the user operation, for example, the display position of the appended data may be changed through a drag operation, or the layered order of the pieces of superimposed appended data may be changed from a top-to-bottom order to a bottom-to-top order through a tap operation or a click operation.

Yet further, the appended data initially displayed at the position of the item image may only display an icon that notifies the user of the presence of the appended data of the image. Next, when the user operates this icon, the appended data display unit 110 may display the detailed contents of the appended data in the form of, for example, the balloon 160 in FIG. 11.

Moreover, the frame size like a displayed balloon may be changed through a user operation, such as a slide operation or a pinch operation. The displayed contents in the balloon may be enlarged or scaled down and displayed, or the display area may be enlarged or scaled down.

As explained above, according to the information processing device 100 of this exemplary embodiment of the present disclosure, in a case in which images of multiple items presented on display are picked up by the user mobile terminal 10 to display appended information on those items, the video is fixedly displayed through a simple user operation so as not to switch the display to the displaying of the information of the adjoining other item when the image position is displaced. When, for example, the image position is displaced despite the user's intent, an inconvenience such that appended data dissipates during the viewing, in particular, dissipates during the scrolling, and the user needs to start over the operation to display again the appended data can be avoided.

In addition, when, for example, the appended data contained in the synthesized video is presented to the other user, the user can view the fixedly displayed appended data through a simple operation, and the display can be returned to a successive display through a simple operation again.

As explained above, according to the information processing device 100 of this exemplary embodiment, the operability when pieces of appended data on multiple images are viewed can be improved.

(Second Exemplary Embodiment)

Figure 12:
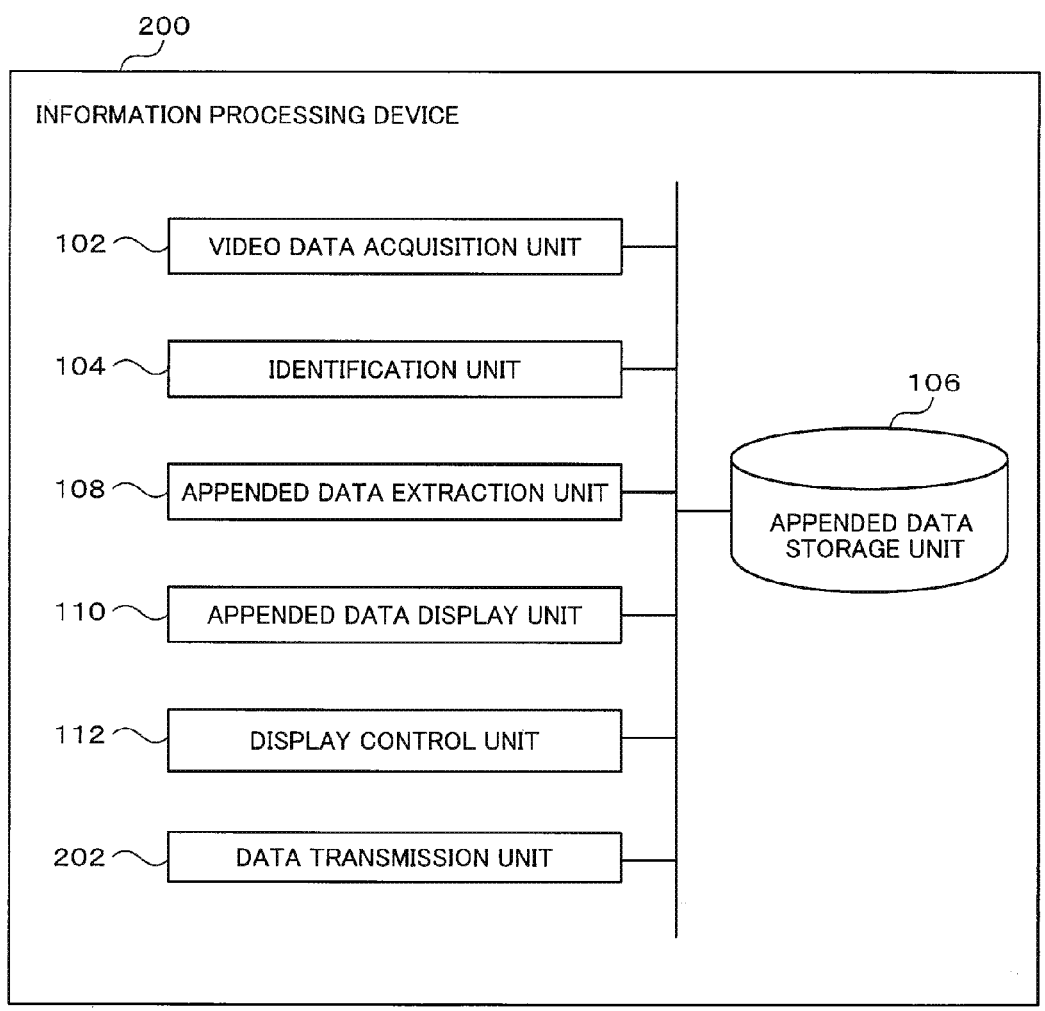
FIG. 12 is functional block diagram illustrating a logical structure of the information processing device according to another exemplary embodiment of the present disclosure.

FIG. 12 is a functional block diagram illustrating a structure of an information processing device 200 according to a second exemplary embodiment. The information processing device 200 of this exemplary embodiment differs from the information processing device 100 of the above-explained embodiment that the appended data is displayed relative to each item on the image, a desired image among the multiple images is selectable, and information on the selected image is transmitted.

The information processing device 200 of this exemplary embodiment includes, in addition to the structure of the information processing device 100 of the above-explained exemplary embodiment, a data transmission unit 202.

The data transmission unit 202 transmits data on the image selected through a user operation among images displayed on the display unit 26 (see FIG. 4) of the user mobile terminal 10.

The data transmission unit 202 may transmit, for example, the order data of an imaged commercial item to the order accepting device. Alternatively, the data transmission unit 202 may transmit a mail or a message to a predetermined address in order to allow the other user to share the information on the imaged item. The data transmission unit 202 may transmit the information on the imaged item so as to allow such information to be introduced on a Twitter or a blog.

An explanation will be below given of an operation of the information processing device 200 employing the above-explained structure according to this exemplary embodiment.

Figure 14:
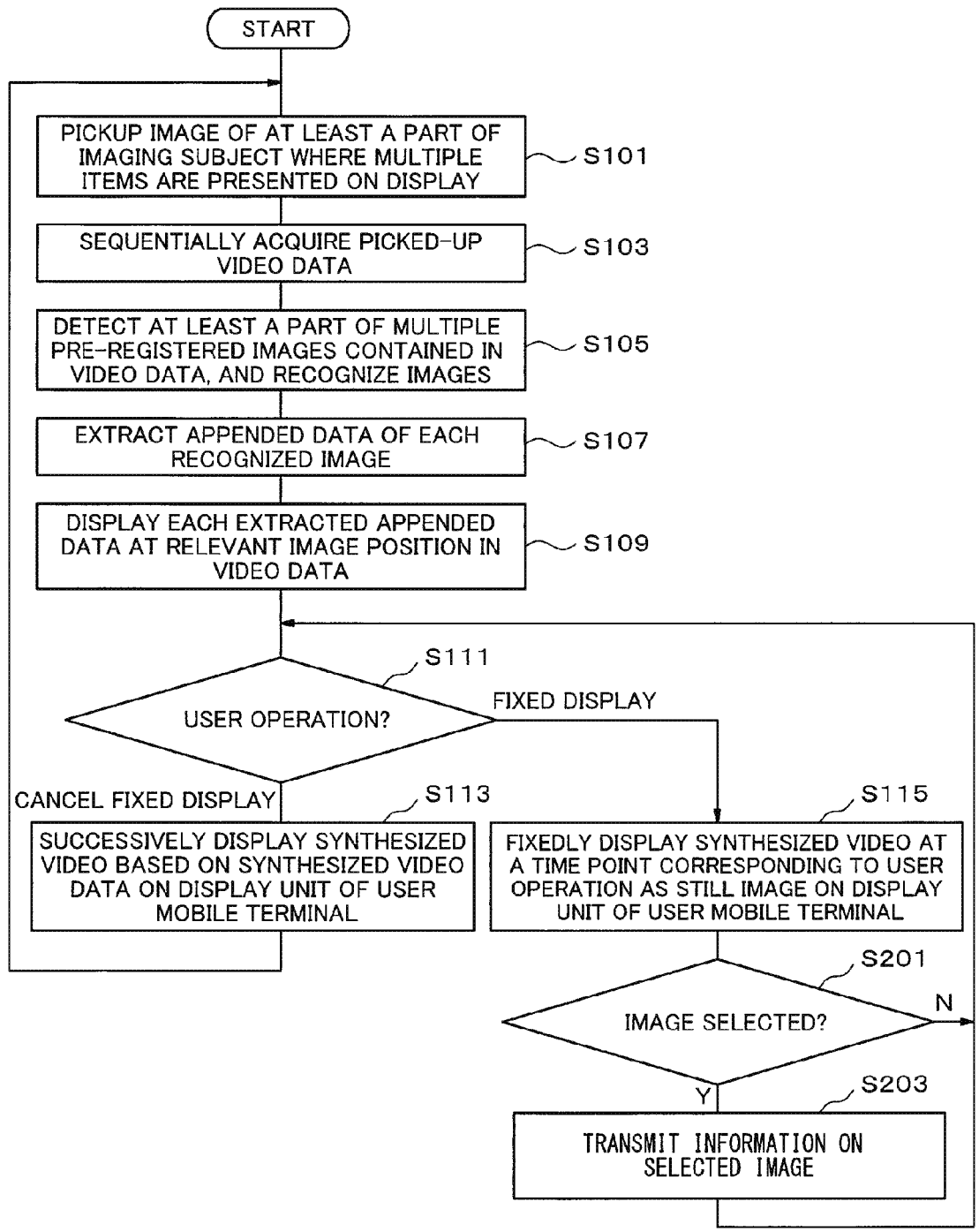
FIG. 14 is a flowchart illustrating an example operation of the information processing device according to another exemplary embodiment of the present disclosure.

FIG. 14 is a flowchart illustrating an example operation of the information processing device 200 of this exemplary embodiment.

The flowchart of FIG. 14 includes the same steps S101 to S115 as those of the flowchart for the information processing device 100 of the above-explained exemplary embodiment in FIG. 6, and further includes steps S201 to S203.

In a condition in which the display control unit 112 fixedly displays in the step S115 the still image of the synthesized video on the display unit 26 of the user mobile terminal 10, when an image among the displayed images is selected through a user operation (step S201: Y), the data transmission unit 202 transmits (step S203) the information on the selected image.

Figure 13:
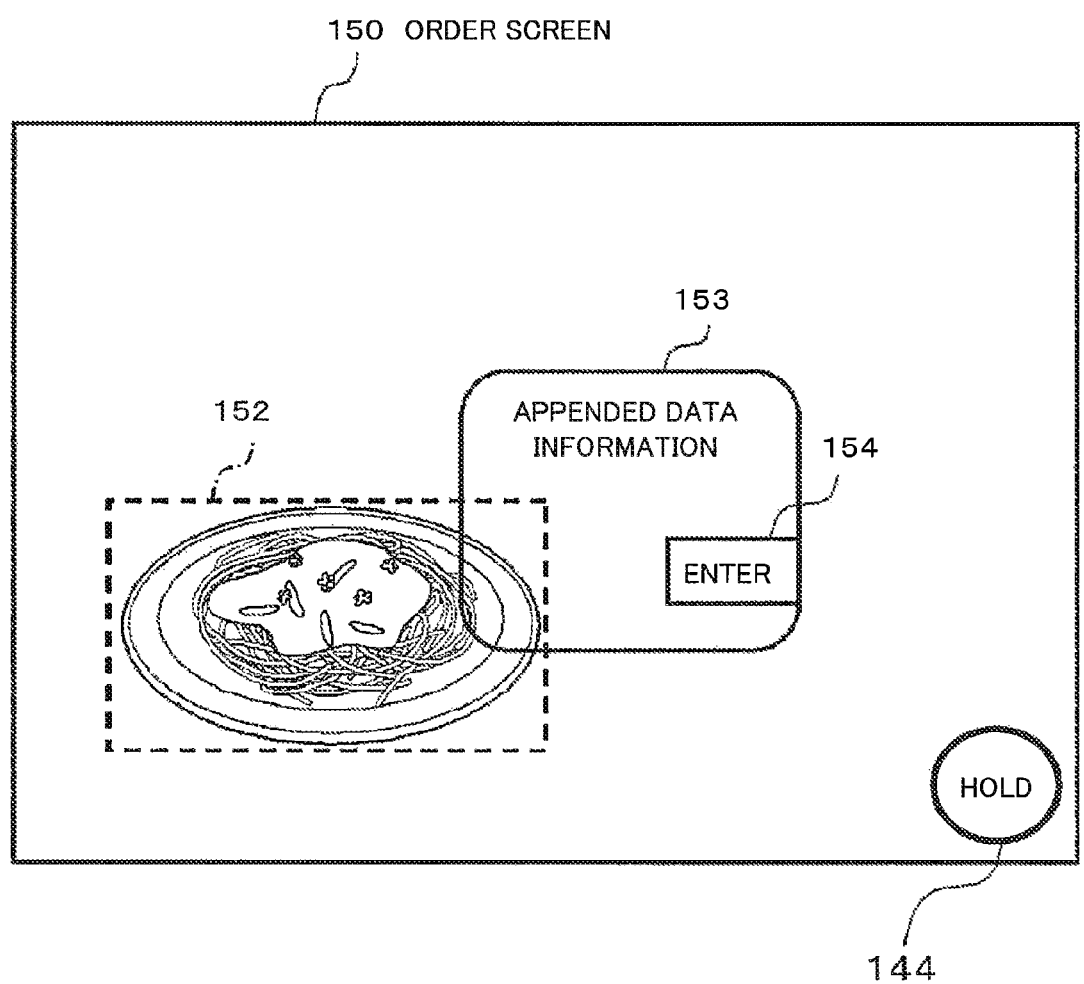
FIG. 13 is a diagram for explaining an ordering scene utilizing a user mobile terminal that is the information processing device according to another exemplary embodiment of the present disclosure.

For example, as illustrated in FIG. 13, an order screen 150 may contain an image recognition area 152 that specifies each of multiple images contained in the video of the menu 7 (see FIG. 3), an appended data display part 153 that displays the appended data on the specified image, and an operation button that accepts an operation to this image, in this example case, an enter button 154 that enters an order for the commercial item.

Through this order screen 150, when the user depresses the enter button 154 that is provided in the appended data display part 153, the imaged commercial item can be ordered. When, however, the video on the order screen 150 is successively displayed, the user mobile terminal 10 may be unstabilized when the user attempts to operate the enter button 154, and thus there is a possibility that the appended data dissipates. Accordingly, when the user operates the hold button 144, the video on the order screen 150 is switched to a still image that is fixedly displayed, facilitating the user to operate the enter button 154.

Next, the data transmission unit 202 becomes able to transmit the order data on the imaged commercial item selected through the operation to the enter button 154.

As explained above, according to the information processing device 200 of this exemplary embodiment, the same advantageous effects as those of the above-explained embodiment can be accomplished, and the information on the image selected through a user operation given to multiple images contained in the fixedly displayed synthesized video can be also transmitted. Since the video is fixed, the operability is excellent, and a false operation, etc., at the time of information transmission is preventable.

The exemplary embodiments of the present disclosure were explained above with reference to the drawings, but those embodiments are merely examples of the present disclosure, and various structures other than the above-explained ones can be employed.

The present disclosure was explained above with reference to the exemplary embodiments and examples thereof, but the present disclosure is not limited to the above-explained exemplary embodiments and examples. Various modifications understandable to those skilled in the art can be made to the structure and detail of the present disclosure within the scope of the present disclosure.

Note that, according to the present disclosure, when information on a person that utilizes the present disclosure (user) is acquired and utilized, such information shall be acquired and utilized lawfully.

Example reference forms will be described below.

[Supplementary Note 1]

A data processing method of an information processing device, the method causing the information processing device to:

sequentially acquire video data which is picked up by an imager and which contains at least a part of imaging subject where a plurality of items are presented on display;

detect that at least a part of a pre-registered image is contained in the video data, and recognize the images therein;

extract, from an appended data storage which stores appended data corresponding to each of the plurality of recognized images, the appended data of each image;

display the appended data of each extracted image at each relevant image position of the video data; and switch, in response to a user operation, a process from a process of successively displaying, on a display of a mobile terminal, a synthesized video based on sequentially acquired synthesized video data to a process of fixedly displaying, as a still image, the synthesized video at a time point corresponding to the user operation.

[Supplementary Note 2]

The data processing method of the information processing device according to the supplementary note 1, in which the information processing device changes, in response to a user operation given to the appended data in the fixedly displayed synthesized video, a display form of the appended data subjected to the user operation in the fixedly displayed synthesized video.

[Supplementary Note 3]

The data processing method of the information processing device according to supplementary note 1 or 2, in which the information processing device further includes a data transmitter that transmits data on an image selected through a user operation among images displayed on the display of the user mobile terminal.

[Supplementary Note 4]

The data processing method of the information processing device according to any one of the supplementary notes 1 to 3, in which the information processing device suspends at least a part of a video data acquisition operation, an image recognition operation, an appended data extraction operation or an appended data display operation while the process of maintaining the fixed display is executed.

[Supplementary Note 5]

The data processing method of the information processing device according to any one of supplementary notes 1 to 4, in which the appended data includes recommendation information, discount information, coupon information, allergy information, evaluation information, or option-service information all related to the image.

[Supplementary Note 6]

The data processing method of the information processing device according to any one of supplementary notes 1 to 5, in which the information processing device comprises the mobile terminal or a server device communicable therewith.

[Supplementary Note 7]

A program causing a computer that realizes an information processing device to:

sequentially acquire video data which is picked up by an imager and which contains at least a part of imaging subject where a plurality of items are presented on display;

detect that at least a part of a pre-registered image is contained in the video data, and recognize the images therein;

extract, from an appended data storage which stores appended data corresponding to each of the plurality of recognized images, the appended data of each image;

display the extracted appended data of each image extracted at each relevant image position of the video data; and switch, in response to a user operation, a process from a process of successively displaying, on a display of a mobile terminal, a synthesized video based on sequentially acquired synthesized video data to a process of fixedly displaying, as a still image, the synthesized video at a time point corresponding to the user operation.

[Supplementary Note 8]

The program according to supplementary note 7, further causing the computer to change, in response to a user operation given to the appended data in the fixedly displayed synthesized video, a display form of the appended data subjected to the user operation in the fixedly displayed synthesized video.

[Supplementary Note 9]

The program according to supplementary note 7 or 8, further causing the computer to transmit data on an image selected through a user operation among images displayed on the display of the mobile terminal.

[Supplementary Note 10]

The program according to any one of supplementary notes 7 to 9, further causing the computer to suspend the operation of at least a part of the video data acquirer, the image recognizer, the appended data extractor or the appended data display while the process of maintaining the fixed display is executed.

[Supplementary Note 11]

The program according to any one of supplementary notes 7 to 10, in which the appended data includes recommendation information, discount information, coupon information, allergy information, evaluation information, or option-service information all related to the image.

[Supplementary Note 12]

The program according to any one of supplementary notes 7 to 11, in which the information processing device comprises the mobile terminal or a server device communicable therewith.

This application claims the priority based on Japanese Patent Application No. 2012-164158 filed on Jul. 24, 2012, the entire contents of which are herein incorporated in this specification by reference.

The invention claimed is:

1. An information processing device comprising:
a memory storing instructions;
a processor configured to execute the instructions to:
  sequentially acquire video data, the video data being picked up by an imager and containing at least a part of imaging subject where a plurality of items are presented on display;
  detect that at least a part of a pre-registered image is contained in the video data, and recognize a plurality of images therein; and
  extract from an appended data storage, appended data corresponding to each of the plurality of images recognized by the image recognizer,
an appended data display that displays the extracted appended data of each of the plurality of images at each relevant image position of the video data; and
a display controller that switches, in response to a user operation, from a process of successively displaying, on a display of a mobile terminal, a synthesized video based on synthesized video data sequentially acquired by the appended data display, to a process of fixedly displaying, as a still image, the synthesized video at a time point corresponding to the user operation;
wherein at least a part of the video data acquisition process, the image recognition process, the appended data extraction process, and the appended data display process is suspended while the display controller maintains the fixed display.

2. The information processing device according to claim 1, wherein the display controller changes, in response to a user operation given to the appended data in the fixedly displayed synthesized video, a display form of the appended data.

3. The information processing device according to claim 1, wherein the processor is further configured to:
  transmit data on an image selected through a user operation among images displayed on the display of the mobile terminal.

4. The information processing device according to claim 1, wherein the appended data includes recommendation information, discount information, coupon information, allergy information, evaluation information, or option-service information related to the image.

5. The information processing device according to claim 1, wherein the information processing device comprises the mobile terminal or a server device communicable therewith.

6. A data processing method implemented by an information processing device, the method comprising:
sequentially acquiring video data, the video data being picked up by an imager and containing at least a part of imaging subject where a plurality of items are presented on display;
detecting that at least a part of a pre-registered image is contained in the video data, and recognizing a plurality of images therein;
extracting, from an appended data storage, appended data corresponding to each of the plurality of recognized images;
displaying the extracted appended data of each of the plurality of images at each relevant image position of the video data; and
switching, in response to a user operation, from a process of successively displaying, on a display of a mobile terminal, a synthesized video based on sequentially acquired synthesized video data to a process of fixedly displaying, as a still image, the synthesized video at a time point corresponding to the user operation;
wherein at least a part of the video data acquisition process, the image recognition process, the appended data extraction process, and the appended data display process is suspended while the fixed display is maintained.

7. A data processing method according to claim 6, further comprising:
changing, in response to a user operation given to the appended data in the fixedly displayed synthesized video, a display form of the appended data.

8. The data processing method according to claim 6, further comprising:
transmitting data on an image selected through a user operation among images displayed on the display of the mobile terminal.

9. The data processing method according to claim 6, wherein the appended data includes recommendation information, discount information, coupon information, allergy information, evaluation information, or option-service information related to the image.

10. The data processing method according to claim 6, wherein the information processing device comprises the mobile terminal or a server device communicable therewith.

11. A non-transitory computer readable medium storing a program which, when executed, causes a computer serving as an information processing device to execute a method comprising:
sequentially acquiring video data, the video data being picked up by an imager and containing at least a part of imaging subject where a plurality of items are presented on display;
detecting that at least a part of a pre-registered image is contained in the video data, and recognizing a plurality of images therein;

extracting, from an appended data storage, appended data corresponding to each of the plurality of recognized images;

displaying the extracted appended data of each of the plurality of images at each relevant image position of the video data; and switching, in response to a user operation, from a process of successively displaying, on a display of a mobile terminal, a synthesized video based on sequentially acquired synthesized video data to a process of fixedly displaying, as a still image, the synthesized video at a time point corresponding to the user operation;

wherein at least a part of the video data acquisition process, the image recognition process, the appended data extraction process, and the appended data display process is suspended while the fixed display is maintained.

12. The non-transitory computer readable medium according to claim 11, wherein the method further comprising:

changing, in response to a user operation given to the appended data in the fixedly displayed synthesized video, a display form of the appended data.

13. The non-transitory computer readable medium according to claim 11, wherein the method further comprising:

transmitting data on an image selected through a user operation among images displayed on the display of the mobile terminal.

14. The non-transitory computer readable medium according to claim 11, wherein the appended data includes recommendation information, discount information, coupon information, allergy information, evaluation information, or option-service information related to the image.

15. The non-transitory computer readable medium according to claim 11, wherein the information processing device comprises the mobile terminal or a server device communicable therewith.

* * * * *

UNITED STATES PATENT AND TRADEMARK OFFICE
CERTIFICATE OF CORRECTION

PATENT NO. : 9,491,368 B2  Page 1 of 1
APPLICATION NO. : 14/416398
DATED : November 8, 2016
INVENTOR(S) : Hiroo Harada It is certified that error appears in the above-identified patent and that said Letters Patent is hereby corrected as shown below:

In the Claims

Claim 6, Column 20, Line 30, "video data to a process" should read -- video data, to a process --.

Claim 11, Column 21, Line 10, "video data to a process" should read -- video data, to a process --.

Signed and Sealed this
Eleventh Day of April, 2017

Michelle K. Lee
*Director of the United States Patent and Trademark Office*